(12) United States Patent
Magnusson et al.

(10) Patent No.: US 9,211,918 B2
(45) Date of Patent: Dec. 15, 2015

(54) ATTACHMENT ARRANGEMENT FOR VEHICLE

(71) Applicant: VOLVO CAR CORPORATION, Goeteborg (SE)

(72) Inventors: Anders Magnusson, Goeteborg (SE); Camilla Waestlund, Moelndal (SE)

(73) Assignee: VOLVO CAR CORPORATION (SE)

( * ) Notice: Subject to any disclaimer, the term of this patent is extended or adjusted under 35 U.S.C. 154(b) by 0 days.

(21) Appl. No.: 13/913,851

(22) Filed: Jun. 10, 2013

(65) Prior Publication Data

US 2013/0328350 A1    Dec. 12, 2013

(30) Foreign Application Priority Data

Jun. 11, 2012 (EP) .................................... 12171451

(51) Int. Cl.
| | |
|---|---|
| *B62D 29/04* | (2006.01) |
| *B62D 25/06* | (2006.01) |
| *B62D 27/02* | (2006.01) |
| *B62D 29/00* | (2006.01) |

(52) U.S. Cl.
CPC .............. *B62D 29/048* (2013.01); *B62D 25/06* (2013.01); *B62D 27/026* (2013.01); *B62D 29/002* (2013.01); *B62D 29/04* (2013.01); *B62D 29/046* (2013.01); *Y10T 156/10* (2015.01)

(58) Field of Classification Search
CPC .... B62D 29/04; B62D 29/046; B62D 29/048; B62D 29/002; B62D 27/026; B62D 25/06; Y10T 156/10

USPC ................ 296/107.07, 210, 187.02, 187.08, 296/193.05, 203.03, 146.5, 185.1, 50, 51, 296/52, 53, 55, 56, 57.1, 37.7, 180.1, 180.2, 296/180.3, 180.5, 191, 29, 30, 146.6; 264/240; 156/272.8, 60
See application file for complete search history.

(56) References Cited

U.S. PATENT DOCUMENTS

| | | | |
|---|---|---|---|
| 5,344,208 A * | 9/1994 | Bien et al. ................. | 296/187.02 |
| 7,004,536 B2 * | 2/2006 | Wieber ......................... | 296/210 |
| 7,249,415 B2 * | 7/2007 | Larsen et al. ................ | 29/897.2 |
| 2007/0246970 A1 | 10/2007 | Widmann et al. | |

FOREIGN PATENT DOCUMENTS

| | | | |
|---|---|---|---|
| DE | 10249420 A1 | 5/2004 | |
| EP | 1386828 A2 | 2/2004 | |
| JP | 038943 U | 1/1991 | |

OTHER PUBLICATIONS

European Search Report Dated Oct. 24, 2012, Applicant Volvo Car Corporation, Application No. 12171451.3-1268, 4 Pages.

* cited by examiner

*Primary Examiner* — Joseph D Pape
*Assistant Examiner* — Dana Ivey
(74) *Attorney, Agent, or Firm* — Brooks Kushman P.C.

(57) ABSTRACT

An attachment arrangement for a vehicle comprises a bracket having a first end part and a second end part. The first end part of the bracket is attachable to an inside of a first vehicle body part. The first vehicle body part is attachable to a second vehicle body part. A structural foam is arranged on the second end part of the bracket. The structural foam has an expansion factor such that when the structural foam is heated, the structural foam is expandable from the second end part of the bracket and adherable to the second vehicle body part.

20 Claims, 7 Drawing Sheets

ATTACHMENT ARRANGEMENT FOR VEHICLE

CROSS-REFERENCE TO RELATED APPLICATIONS

This application claims foreign priority benefits under 35 U.S.C. §119(a)-(d) to European patent application number EP 12171451.3, filed Jun. 11, 2012, which is incorporated by reference in its entirety.

TECHNICAL FIELD

The disclosure relates to an attachment arrangement for a vehicle.

BACKGROUND

Different ways of fastening various attachments to a vehicle are known in the art. These methods may involve various types of adhesives, sealants or other ways to provide a strong enough support for an attachment. For instance a roof panel comprising a bracket for mounting a roof rack may be attached to an outer body side of a vehicle by means of glue.

A reason for implementing a bracket is to create additional strength and at the same time avoid visible defects by creating a system which allows geometrical variations caused by part to part variations and process variations.

A problem today is that the attachments may give read-through to an outer body side leading to the outer body side not being aesthetical in appearance. The attachment means may further be visible on the body side panel or be located in a groove, wherein the visibility of the attachments means or the groove reduces the aesthetic appearance of the body side panel.

There is clearly a need for an improved attachment arrangement.

SUMMARY

An object of the present disclosure is to provide an attachment arrangement for a vehicle where the previously mentioned problem is avoided.

The present disclosure relates to an attachment arrangement for a vehicle. The attachment arrangement comprises a bracket having a first end part and a second end part. The first end part of the bracket is attached to an inside of a first vehicle body part, where the first vehicle body part is attached to a second vehicle body part. Structural foam is arranged on the second end part of the bracket. The structural foam has an expansion factor such that when the structural foam is heated, the structural foam expands from the second end part of the bracket and adheres to the second vehicle body part.

One advantage with an attachment arrangement according to the disclosure is that it provides an alternate way to provide strength to different forms of attachment arrangements for a vehicle. With attachment arrangement is meant an arrangement making it possible to attach various parts to a vehicle. By using a bracket comprising a structural foam which is capable to expand when heated such that the bracket and foam connects to the second vehicle body part it is possible to create attachment arrangements that are more aesthetically appealing than can be made today while still maintaining the required strength to support the weight and stress of the attached part.

The structural foam can be any suitable foam having a predetermined expansion coefficient. By using foam with a predetermined expansion coefficient it is possible to control the expansion of the foam when the foam is heated such that the desired characteristics of the attachment arrangement are provided. The strength of the attachment arrangement comes from when the second end part of the bracket connects to the second vehicle body part by means of the structural foam. The load from the first vehicle body part is thereby transferred via the bracket to the second vehicle body part.

The structural foam may be attached only to a first side of the second end part of the bracket which faces the second vehicle body part.

In order to further control the way the second end part of the bracket connects to the second vehicle body part, the structural foam may be placed only on a side of the second end part of the bracket that faces the second vehicle body part. This means that the foam is placed on a side of the second end part of the bracket that faces away from the first vehicle body part. This is done in order to ensure proper adhesion of the foam, and thus of the bracket, to the second vehicle body part and that no or only a small amount of foam expands above the bracket.

The structural foam may be attached to both a first side of the second end part of the bracket which faces the second vehicle body part and to a second side of the second end part of the bracket which faces the inside of the first vehicle body part.

The structural foam may be positioned in an opening in the second end part of the bracket such that the structural foam faces both away from the inside of the first vehicle body part and towards the inside of the first vehicle body part.

The amount of structural foam attached to the second end part may be adapted to make the foam expand towards the inside of the first vehicle body part such that the foam does not adhere to the first vehicle body part when the structural foam is heated.

It is important that the foam does not adhere to the first vehicle body part. Having the foam adhere to the first vehicle body part may cause read-through to the skin of the first vehicle body part, thereby reducing the aesthetic appeal of the skin. It may also affect the fit between the first vehicle body part and the second vehicle body part.

A vehicle attachment may be arranged to be mounted on an outer side of the first body part where the first end part of the bracket is attached to the first vehicle body part.

By attaching the bracket to the first vehicle body part a suitable location for mounting a vehicle attachment is provided The vehicle attachment may be one of: A roof rail, a tailgate or boot lid spoiler or any type of a vehicle ornament.

The attachment arrangement may of course be used on more than one location on a vehicle.

The bracket may have a shape such that the second end of the bracket is positioned closer to the second vehicle body part than the first vehicle body part.

The first end part of the bracket may be positioned higher than the second end part of the bracket, the first end part of the bracket being connected to the second end part of the bracket by a curved centre part or by a straight, slanted centre part.

The bracket may have any suitable shape for transferring stress and forces from the first vehicle body part to the second vehicle body part through the bracket and structural foam. One suitable configuration for the bracket is that the second end of the bracket is positioned closer to the second vehicle body part than the first vehicle body part. With this configuration fulfilled the bracket can have a number of different shapes. The bracket may for instance have an S-shape, a U-shape lying on its side, an inverted Z-shape or a shape being defined by a mathematical expression such as a polynomial function or a trigonometrical function. The bracket may also have a shape that cannot be expressed in terms of an analytical expression.

The bracket may be attached to the first vehicle body part by means of welding, riveting and/or clinching. It is of course possible to use other attachment methods for attaching metal parts to each other.

The first vehicle body part may be a roof skin, and the second vehicle body part may be a body-in-white part. The roof skin may be laser brazed, laser welded or bonded to the body-in-white part. With bonded means an attachment method that includes an adhesive or similar to fasten the vehicle parts to each other.

The first vehicle body part may also be a tailgate, a boot lid or a hood. For each of these cases the second vehicle body part is adapted to fit the first vehicle body part.

One advantage with the disclosure is that the attachment arrangement is adaptable to a number of applications for a vehicle where a vehicle attachment may be desirable to attach. As stated above a roof rail, a tailgate or boot lid spoiler or a vehicle ornament may be attached to the vehicle at suitable locations using an attachment arrangement according to the disclosure.

The structural foam may be heated in a curing process during manufacturing of the vehicle. A curing process may be any process during manufacturing of the vehicle where heat is applied to at least the part of the vehicle where the structural foam is located.

The disclosure also provides for a vehicle comprising an attachment means according to the disclosure.

The disclosure further relates to a method for forming an attachment means for a vehicle. The method comprises:
  attaching structural foam to a second end part of a bracket;
  fastening the first end part of the bracket to a first vehicle body part;
  positioning and attaching the first vehicle body part to a second vehicle body part, where the structural foam has an expansion factor adapted to make the foam expand from the second end part of the bracket such that the foam adheres to the second vehicle body part when the structural foam is heated.

The method may further comprise:
  attaching the first vehicle body part to a second vehicle body part by means of laser brazing, laser welding or bonding.

The method may further comprise:
  heating the structural foam in a curing process during manufacturing of the vehicle such that the foam expands and adheres to the second vehicle body part.

DETAILED DESCRIPTION

Figure 1:
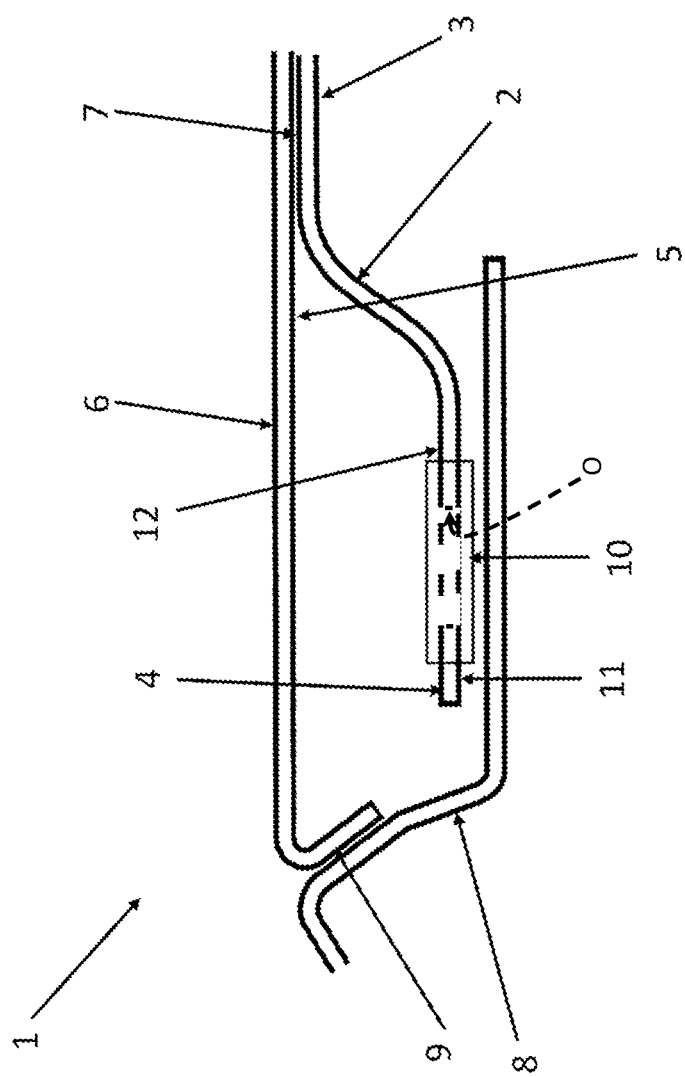
FIG. 1 schematically shows a side view of an attachment arrangement according to a first aspect of the disclosure.

FIG. 1 schematically shows a side view of an attachment arrangement 1 according to a first aspect of the disclosure. The attachment arrangement 1 comprises a bracket 2 comprising a first end part 3 and a second end part 4. The first end part 3 of the bracket 2 is attached to an inside 5 of a first vehicle body part 6 at a first attachment point 7. The first end part 3 can be attached to the inside 5 of the first vehicle body part 6 by means of for instance welding, riveting and/or clinching. Other attachment methods are also possible.

The first vehicle body part 6 is further attached to a second vehicle body part 8 at a second attachment point 9. The first vehicle body part 6 is attached to the second vehicle body part 8 by means of laser brazing, laser welding or bonding. Other attachment methods are also possible.

In FIG. 1 a structural foam 10 is arranged on the second end part 4 of the bracket 2. For example, the structure foam 10 may be positioned in an opening O (shown with dashed lines in FIG. 1) in the second end part 4 of the bracket 2. The structural foam 10 has an expansion factor such that when the structural foam is heated, the foam is arranged to expand from the second end part 4 of the bracket 2 and adhere to the second vehicle body part 8. Such structural foams are well known in the art. In FIG. 1 the structural foam 10 is placed on both a first side 11 and a second side 12 of the second end part 4 of the bracket 2. The first side 11 of second end part 4 of the bracket 2 faces the second vehicle body part 8. The second side 12 of the second end part 4 of the bracket 2 faces the inside 5 of the first vehicle body part 6. The placement of the structural foam 10 in FIG. 1 is merely illustrative, the structural foam 10 may be placed such that it is aligned with the outmost edge of the second end part 4 of the bracket 2.

The first vehicle body part 6 and the second vehicle body part 8 in FIG. 1 are illustrated by means of only one sheet. It is of course possible for the first vehicle body part 6 and/or the second vehicle body part 8 to comprise more than one sheet.

Figure 2:
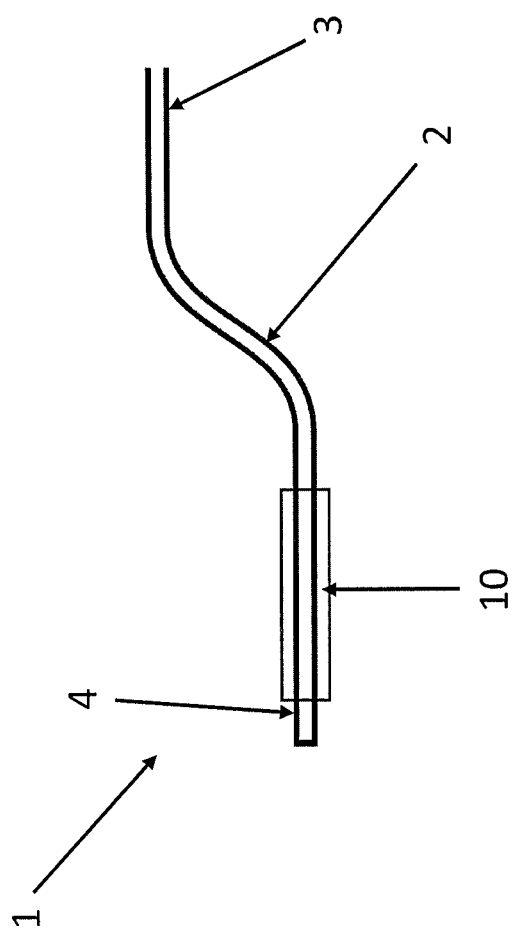
FIG. 2 schematically shows a first method step for forming an attachment arrangement according to the disclosure.

FIG. 2 schematically shows a first method step for forming an attachment arrangement 1 according to the disclosure. In FIG. 2 the structural foam 10 is attached to the second end part of the bracket 2. The bracket 2 is now ready for attachment to the first vehicle body part (not shown in FIG. 2). In FIG. 2 the first end part 3 of the bracket 2 is cropped for simplicity. The first end part 3 and the second end part 4 of the bracket 2 may be of equal length or of different lengths depending on the desired characteristics of the bracket 2.

Figure 3:
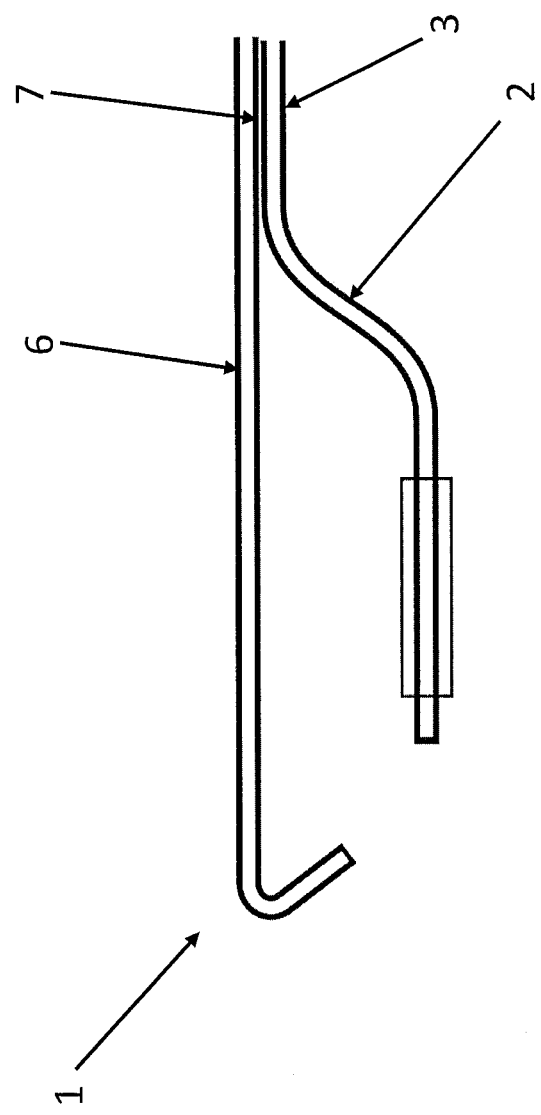
FIG. 3 schematically shows a second method step for forming an attachment arrangement according to the disclosure.

FIG. 3 schematically shows a second method step for forming an attachment arrangement 1 according to the disclosure. In FIG. 3 the first end part 3 of bracket 2 has been attached to the first vehicle body part 6 at a first attachment point 7. The attachment method of the first end part 3 of bracket 2 to the first vehicle body part 6 can be any suitable attachment method such as welding, riveting and/or clinching.

In FIG. 3 the first vehicle body part 6 is a roof panel. As stated above, the first vehicle body part 6 may be any part of a vehicle that is attached to another vehicle body part.

Figure 4:
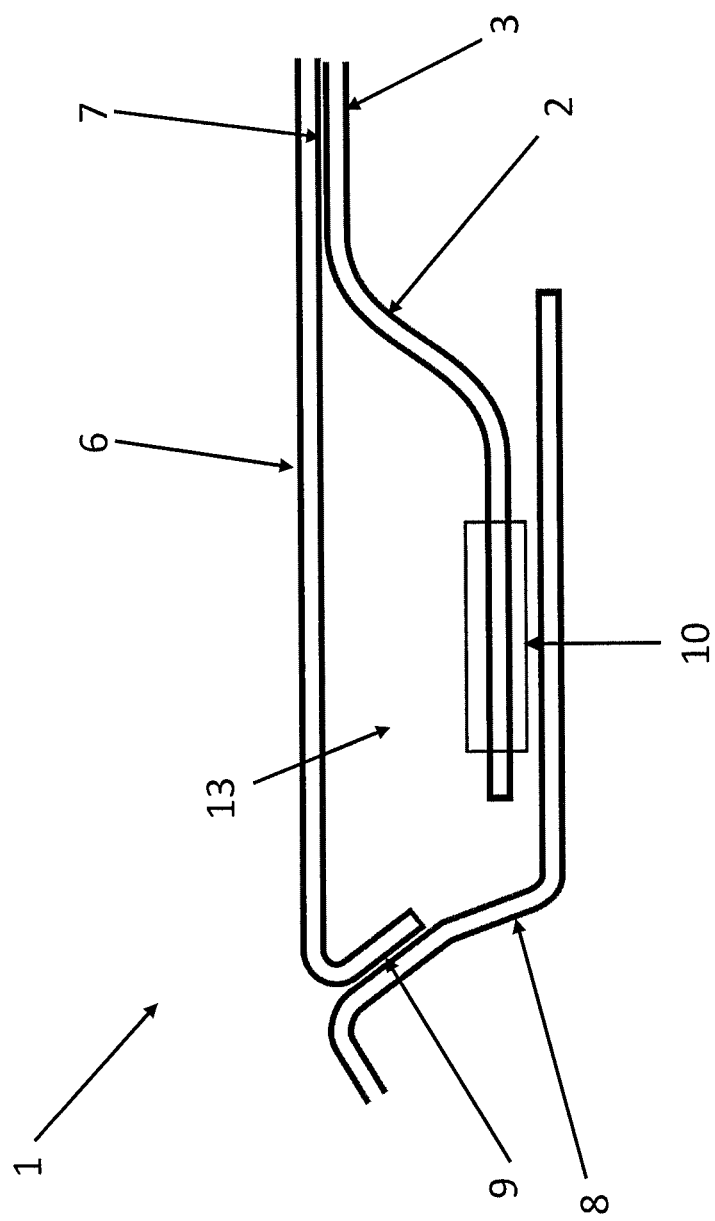
FIG. 4 schematically shows a third method step for forming an attachment arrangement according to the disclosure.

FIG. 4 schematically shows a third method step for forming an attachment arrangement 1 according to the disclosure. In FIG. 4 the first vehicle body part 6 is attached to a second vehicle body part 8 at a second attachment point 9. The attachment method of first vehicle body part 6 to the second vehicle body part 8 can be any suitable attachment method such as brazing, welding or bonding. Brazing can for instance be done by laser brazing. Welding can for instance be done by laser welding.

As can be seen from FIG. 4 the bracket 2 with the attached structural foam 10 is located in a space 13 created when the first vehicle body part 6 is attached to the second vehicle body part 8. As can be further be seen from FIG. 4 the structural foam 10 is placed at a distance from the second vehicle body part 8. The distance and thereby the shape of the bracket may be adapted to allow for different expansion factors of different structural foams.

Figure 5:
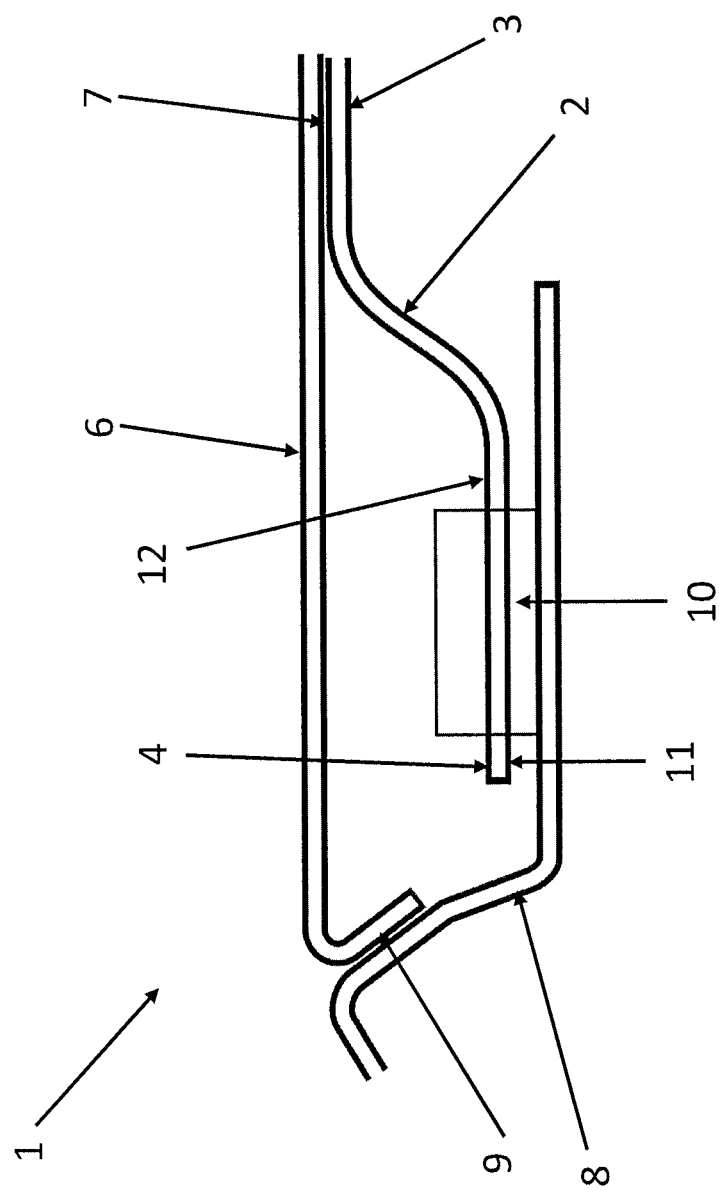
FIG. 5 schematically shows a fourth method step for forming an attachment arrangement according to the disclosure.

FIG. 5 schematically shows a fourth method step for forming an attachment arrangement 1 according to the disclosure. FIG. 5 shows the attachment arrangement 1 with the structural foam 10 expanded to adhere to the second vehicle body part 8. As the structural foam 10 has adhered to the second vehicle body part 8 the first vehicle body part 6 is in structural connection with the second vehicle body part 8 via the bracket 2 meaning that forces and stress applied to the first vehicle body part 6 can be transferred through the bracket 2 to the second vehicle body part 8. As can be seen from FIG. 5 the structural foam 10 has expanded into the space 13 between the first vehicle body part 6 and the second vehicle body part 8 but not to the extent that the structural foam 10 adheres to the first vehicle body part 6. As the expansion factor of the structural foam 10 can be determined accurately it is possible to design an attachment arrangement 1 where this condition is fulfilled. If the structural foam 10 would be allowed to expand such that it adheres to the first vehicle body part 6, the first vehicle body part 6 could possibly be deformed by the force applied by the structural foam 10.

The attachment arrangement 1 according to the disclosure with the bracket 2 makes it possible for such an arrangement to carry loads from the first vehicle body part 6 to the second vehicle body part 8 without the first vehicle body part 6 being deformed as would otherwise happen if the bracket 2 was not able to carry loads from the first vehicle body part 6 to the second vehicle body part 8.

Figure 6:
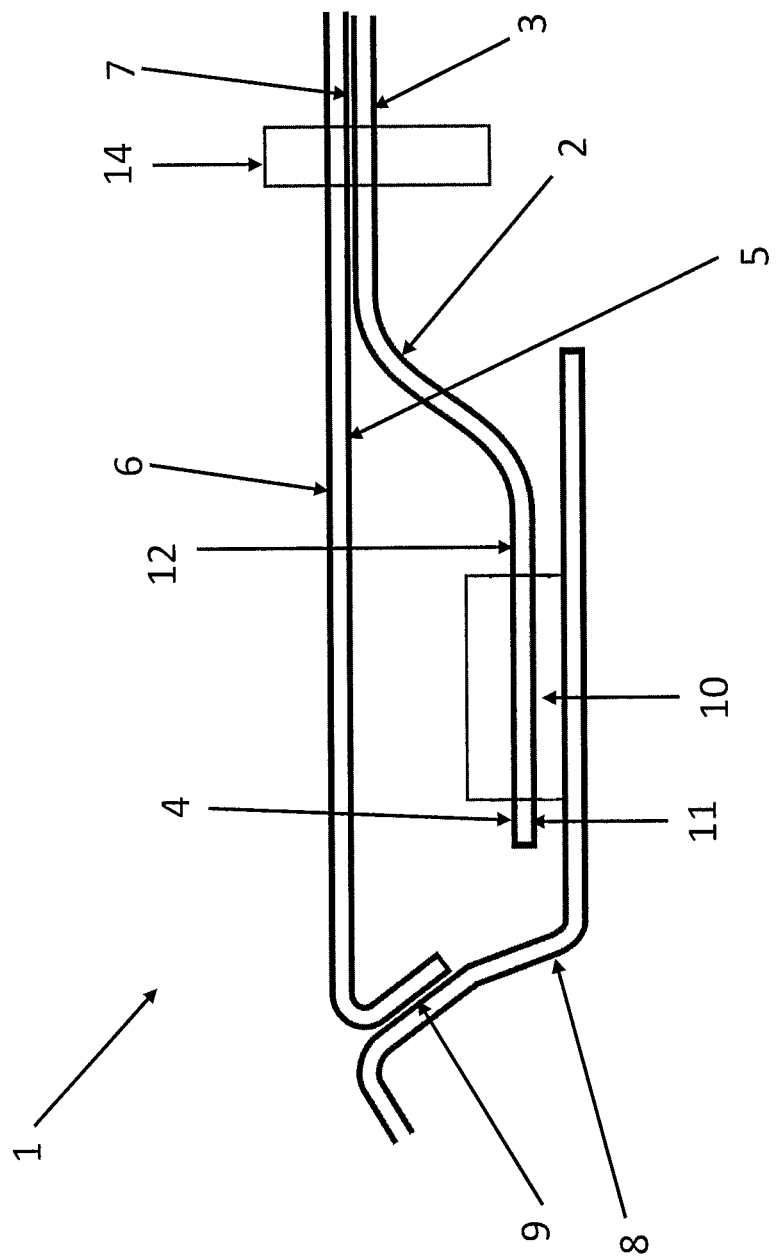
FIG. 6 schematically shows an attachment arrangement according to the disclosure.

FIG. 6 schematically shows an attachment arrangement 1 according to the disclosure. In FIG. 6 the attachment arrangement is complete with a mounting 14 for a vehicle attachment. The mounting 14 is located essentially in the same place as the first attachment point 7 but the placement of the mounting 14 in FIG. 6 should not be seen as limiting. The appearance of the mounting 14 in FIG. 6 is merely illustrative. The mounting 14 may comprise any known mounting known in the art suitable for attaching a vehicle attachment to an outer side of a vehicle. As can be seen from FIG. 6 an attachment arrangement according to the disclosure allows for a placement of the mounting 14 on the outer side of a vehicle such that a smooth surface of the vehicle can be achieved.

Figure 7:
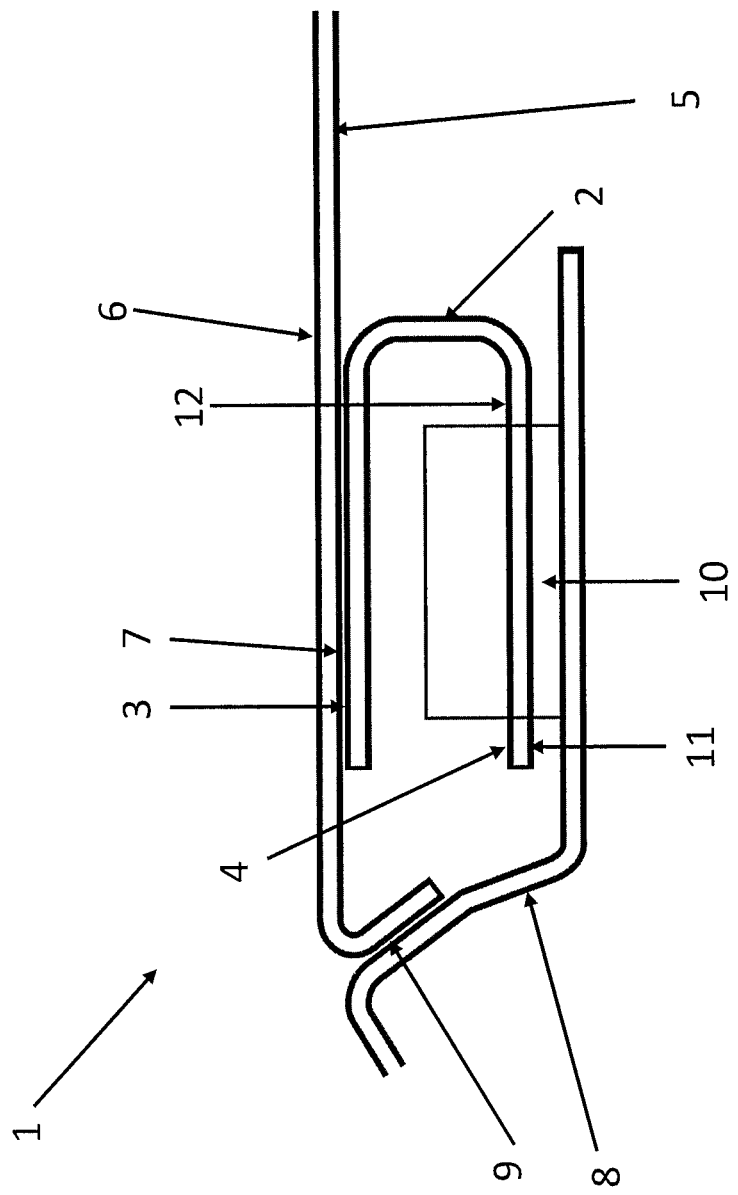
FIG. 7 schematically shows a side view of an attachment arrangement according to a second aspect of the disclosure.

FIG. 7 schematically shows a side view of an attachment arrangement according to a second aspect of the disclosure. In FIG. 7 the bracket 2 has an essentially U-shaped cross section. This allows for a different placement of the first attachment point 7 than in the configuration shown in FIGS. 1-6. The first end part 3 of the bracket 2 and the second end part 4 of the bracket 2 in the configuration according to FIG. 6 do not need to be of equal length as long as they face the same way. The first end part 3 of the bracket 2 and the second end part 4 of the bracket 2 may face the second vehicle body part 8 as shown in FIG. 7 or the first end part 3 of the bracket 2 and the second end part 4 of the bracket 2 may face away from the second vehicle body part 8.

As will be realized, the disclosure is capable of modification in various obvious respects, all without departing from the scope of the appended claims. Accordingly, the drawings and the description thereto are to be regarded as illustrative in nature, and not restrictive.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. An attachment arrangement for a vehicle, the attachment arrangement comprising:
   a bracket having a first end part and a second end part, the first end part of the bracket being attachable to an inside of a first vehicle body part, wherein the first vehicle body part is attachable to a second vehicle body part; and
   a structural foam arranged on the second end part of the bracket, the structural foam having an expansion factor and being heatable such that the structural foam is expandable from the second end part of the bracket and adherable to the second vehicle body part without contacting the first vehicle body part, such that the first vehicle body part is structurally connectable with the second vehicle body part via the bracket.

2. The attachment arrangement according to claim 1 wherein the structural foam is attached only to a first side of the second end part of the bracket which is configured to face the second vehicle body part.

3. The attachment arrangement according to claim 1 wherein the structural foam is attached to both a first side of the second end part of the bracket which is configured to face the second vehicle body part and to a second side of the second end part of the bracket which is configured to face the inside of the first vehicle body part.

4. The attachment arrangement according to claim 1 wherein the structural foam is positioned in an opening in the second end part of the bracket such that the structural foam is configured to face both away from the inside of the first vehicle body part and towards the inside of the first vehicle body part.

5. The attachment arrangement according to claim 3 wherein the structural foam attached to the second end part of the bracket is adapted to expand toward the inside of the first vehicle body part upon heating, but the structural foam is configured not to be adherable to the first vehicle body part.

6. The attachment arrangement according to claim 1 further comprising a vehicle attachment arranged to be mounted on an outer side of the first vehicle body part where the first end part of the bracket is attachable to the first vehicle body part.

7. The attachment arrangement according to claim 6 wherein the vehicle attachment is one of a roof rail, a tailgate, a boot lid spoiler, or a vehicle ornament.

8. The attachment arrangement according to claim 1 wherein the bracket has a shape such that the second end part of the bracket is positionable closer to the second vehicle body part than the first vehicle body part.

9. The attachment arrangement according to claim 1 wherein the first end part of the bracket is positionable higher than the second end part of the bracket, the first end part of the bracket being connected to the second end part of the bracket by a curved center part or by a straight, slanted center part.

10. The attachment arrangement according to claim 1 wherein the bracket is attachable to the first vehicle body part by welding, riveting and/or clinching.

11. The attachment arrangement according to claim 1 wherein the first vehicle body part is a roof skin, and the second vehicle body part is a body-in-white part, and wherein the roof skin is laser brazed, laser welded or bonded to the body-in-white part.

12. The attachment arrangement according to claim 1 wherein the structural foam is configured to be heated in a curing process during manufacturing of the vehicle.

13. A vehicle comprising an attachment arrangement according to claim 1.

14. A method for forming an attachment arrangement for a vehicle, the method comprising:
   attaching structural foam to a second end part of a bracket;
   fastening a first end part of the bracket to an inner side of a first vehicle body part; and
   attaching the first vehicle body part to a second vehicle body part;
   wherein the structural foam has an expansion factor adapted to make the structural foam expand from the second end part of the bracket and adhere to the second vehicle body part when the structural foam is heated, and without the structural foam contacting the first vehicle body part, such that the first vehicle body part is structurally connectable with the second vehicle body part via the bracket.

15. The method for forming an attachment arrangement according to claim 14 wherein attaching the first vehicle body part to the second vehicle body part is performed by means of laser brazing, laser welding.

16. The method for forming an attachment arrangement according to claim 14 further comprising heating the structural foam in a curing process during manufacturing of the vehicle such that the structural foam expands and adheres to the second vehicle body part without the structural foam contacting the first vehicle body part, and such that the structural foam attaches the second end part of the bracket to the second vehicle body part.

17. A vehicle comprising:
   a first vehicle body part;
   a second vehicle body part attached to the first vehicle body part at an attachment point, the second vehicle body part having a portion spaced away from the first vehicle body part at a location spaced away from the attachment point; and
   an attachment arrangement including a bracket having a first end part and a second end part, the first end part of the bracket being attached to an inner surface of the first vehicle body part at a location spaced apart from the attachment point, and a structural foam arranged on the second end part of the bracket, the structural foam being expanded and adhered to the second vehicle body part at a location spaced away from the attachment point, without the structural foam contacting the first vehicle body part, so that the first vehicle body part is in structural connection with the second vehicle body part via the bracket.

18. The vehicle according to claim 17 wherein the structural foam is attached to both a first side of the second end part of the bracket, which faces the second vehicle body part, and to a second side of the second end part of the bracket, which faces the inner surface of the first vehicle body part, and wherein the structural foam attached to the second end part of the bracket is not adhered to the first vehicle body part.

19. The vehicle according to claim 17 wherein the structural foam is positioned in an opening in the second end part of the bracket such that the structural foam faces toward the inner surface of the first vehicle body part and toward the second vehicle body part.

20. The vehicle according to claim 17 wherein the bracket has a U-shaped cross-section.

* * * * *